United States Patent
Wu

(10) Patent No.: US 6,392,357 B1
(45) Date of Patent: May 21, 2002

(54) ELECTRIC CIRCUIT DEVICE FOR LIGHTING SETS

(75) Inventor: Tai-Gann Wu, Hsin-Tien (TW)

(73) Assignee: Chu-Da Artificial Flowers & Crafts Co., Ltd., Taiwan (*) Notice: Subject to any disclaimer, the term of this patent is extended or adjusted under 35 U.S.C. 154(b) by 7 days.

(21) Appl. No.: 09/708,054

(22) Filed: Nov. 8, 2000

(51) Int. Cl.[7] .............................................. H05B 37/00
(52) U.S. Cl. ........................ 315/185 R; 315/200 R; 315/291; 362/227
(58) Field of Search .................... 315/185 R, 185 S, 315/200 R, 200 A, 291, 302, 362; 362/95, 184, 227; 368/806

(56) References Cited

U.S. PATENT DOCUMENTS

| 4,654,629 A | * | 3/1987 | Bezos et al. ................ 340/87 |
| 5,150,016 A | * | 9/1992 | Sawase et al. ............. 315/294 |
| 6,184,628 B1 | * | 2/2001 | Ruthengerg ............. 315/185 R |

* cited by examiner

Primary Examiner—Don Wong
Assistant Examiner—Jimmy T. Vu
(74) Attorney, Agent, or Firm—Troxell Law Office PLLC

(57) ABSTRACT

The present invention relates to a kind of electric circuit device for lighting sets, which features a function-selecting circuit in connection with an automated driving circuit and a voice-controlled driving circuit. The automated driving circuit and the voice-controlled driving circuit are provided in connection with a message-processing circuit, which is connected to a controlling circuit. The controlling circuit is connected to a light-emitting circuit, so the user may connect the light-emitting circuit to the automated driving circuit or voice-controlled driving circuit through manipulating the function-selecting circuit. Then, the message-processing circuit will transmit the commands generated by an automated driving circuit or a voice-controlled circuit to the controlling circuit, which allows the controlling circuit to drive the light-emitting circuit, so the light-emitting device on the light-emitting circuit is capable of creating changes according to the commands.

2 Claims, 3 Drawing Sheets

ELECTRIC CIRCUIT DEVICE FOR LIGHTING SETS

SUMMARY OF THE INVENTION

This invention relates to a kind of electric circuit device for lighting sets that makes the light-emitting circuit change along with the changes in the driving circuit through drives of the driving circuit in different modes and the controlling circuit in connection with the light-emitting circuit.

DESCRIPTION OF THE PRIOR ART

Whereas average lamp used as lighting set in a household living room would feature the light bulb on the socket, bearing a shade to cover the light bulb. Such a construction suggests a monotonous pattern that would be interest of nobody around it.

To overcome this known flaw, the creator of this invention is introducing improvements and intends to find better solutions to this construction. After repeated researches and designs, this invention became a successful improvement on the lighting set in question.

The main purpose of this invention is to provide a kind of electric circuit for lighting sets having a function selecting circuit in connection with an automated driving circuit and a voice-controlled driving circuit. Said the automated driving circuit and the voice-controlled driving circuit are provided in connection with a message processing circuit and a message processing circuit connected to a controlling circuit. Said the controlling circuit is in connected to a light-emitting circuit, so that the user may have access to the controlling circuit through the function selecting circuit in the connection with the automated driving circuit or the voice-controlled driving circuit. The command generated by the automated driving circuit or the voice-controlled driving circuit will transmit to the controlling circuit through the message processing circuit, allowing the controlling circuit to drive the light-emitting circuit so that the light-emitting device on the light-emitting circuit is capable of creating changes according to the command.

Another purpose of this invention is to provide a kind of electric circuit for lighting sets. Being the automated driving circuit in connection with an automated circuit and a manual circuit to allow the function selecting circuit to linked to the automated driving circuit; so that when the user starts the manual circuit, the automated driving circuit would turn into manual control mode. Otherwise, the control circuit would be switched to automated mode through the automated circuit.

To further learn and understand the purpose, construction, feature and performance of this invention, the following figures are provided with embodiments for detailed explanation:

Figure 1:
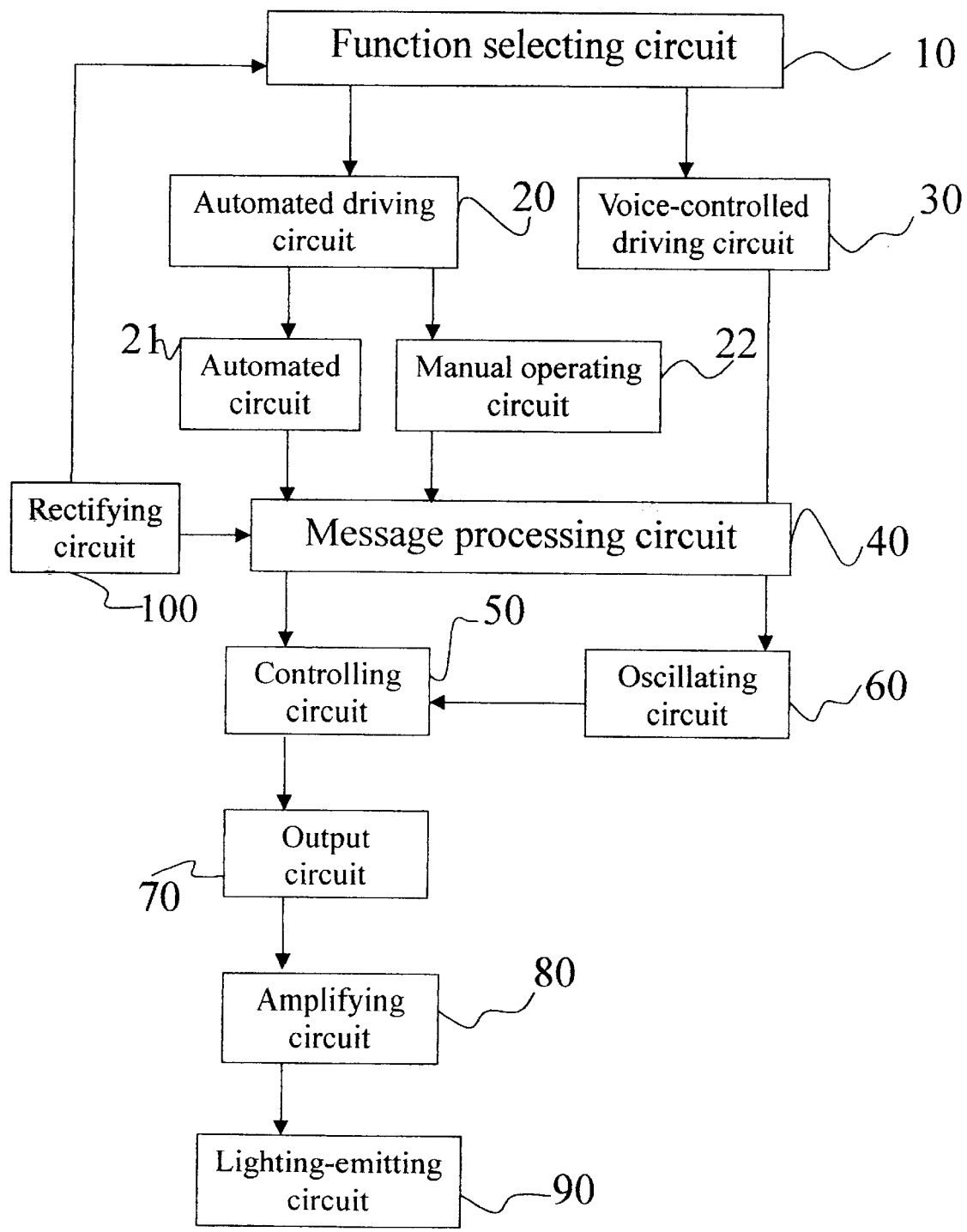
FIG. 1: Circuit diagram block of this invention

Number of the key components:
Function selecting circuit 10
Automated driving circuit 20
Voice-controlled driving circuit 30
Message processing circuit 40
Controlling circuit 50
Oscillating circuit 60
Output circuit 70
Amplifying circuit 80
Light-emitting circuit 90
Rectifying circuit 100

As shown in FIG. 1, this invention relates to a kind of electric circuit device for lighting sets having a function selecting circuit 10, which in this embodiment is a switch (though a skilled operator may replace the switch by other components). The function selecting circuit 10 comes in connection with an automated driving circuit 20 and a voice-controlled driving circuit 30. The voice-controlled driving circuit 30 is an operating circuit that operates by means of the different voice frequencies and the automated driving circuit 20 is in connection with an automated circuit 21 of preset operating sequence and a manual operating circuit 22. Besides, the manual operating circuit 22 is in connection with a key (not shown) through the wiring.

Figure 2:
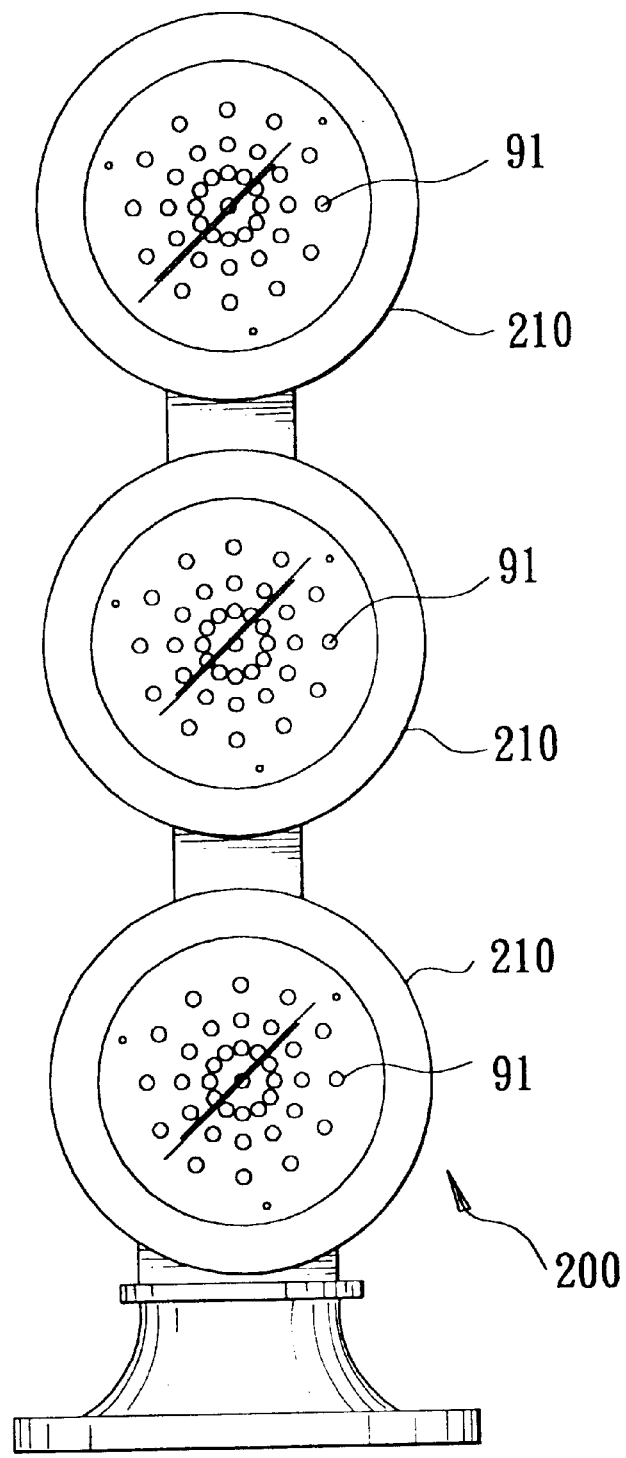
FIG. 2: An operating view of this invention
Figure 3:
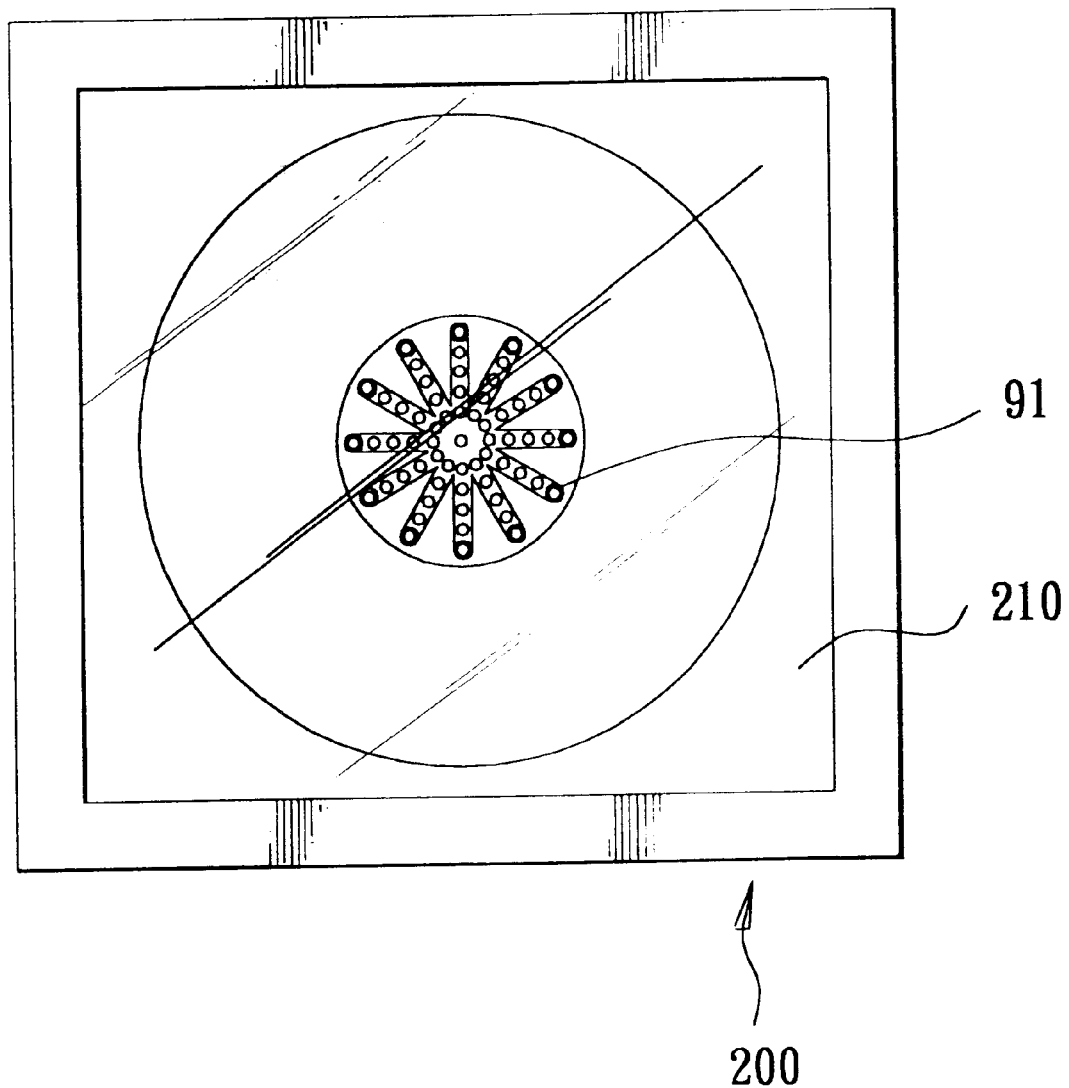
FIG. 3: Another operating view of this invention

Further, said the automated circuit 21 and the manual operating circuit 22 through the wiring are connected to an oscillating circuit 60 and a message processing circuit 40, where the oscillating circuit 60 is simultaneously connected to the message processing circuit 40. Meanwhile, the message processing circuit 40 is connected to a controlling circuit 50 and controlling circuit 50 is in connection with a light-emitting circuit 90 through an output circuit 70 and an amplifying circuit 80. The said light-emitting circuit 90 has a plurality of light emitters 91 (as shown in FIGS. 2, 3). In this embodiment, the light emitters are made of a plurality of light-emitting diodes (though a skilled operator may replace the switch with other components). The controlling circuit 50 output messages through the output circuit 70 and the amplifying circuit 80 amplify the output messages and eventually, make the light-emitting circuit 90 go on and off, As a result, the light emitter 91 of the light-emitting circuit 90 create changes. This embodiment shows the functions in 8 different settings as follows:

1. Setting 1 (COMBINATION), covering changes from setting 2 to setting 7.
2. Setting 2 (IN WAVES), allowing the light emitter 91 to create 2 kinds of undulated changes going forward and backward.
3. Setting 3 (SEQUENTAL), allowing the light emitter 91 to create 4 kinds of changes as in a revolving lantern.
4. Setting 4 (SLO-GLO), allowing single light emitter 91 to create 3 kinds of slow-glowing and slow-dimming changes.
5. Setting 5 (CHASING/FLASH), allowing the light emitter 91 to create revolving lantern, forward, backward and flash among other changes.
6. Setting 6 (SLOW FADE), allowing the light emitter 91 to create synchronized glow and fade.
7. Setting 7 (TWINKLE/FLASH), allowing the light emitter 91 to create revolving lantern and twinkling effect.
8. Setting 8 (STEAD ON), allowing all the light emitter 91 goes on.

Further, said the controlling circuit 50 is in connection with the rectifying circuit 100, and the rectifying circuit 100 is in connection with the input power and the function selecting circuit 10, allowing the conversion of the inputting AC power into DC power through the rectifying circuit 100 and eventually convey the DC power to the function selecting circuit 10 and the controlling circuit 50 for operation.

FIGS. 1, 2 and 3 show this invention in operation. First, the user may install this invention on a lamp 200 of any shape. In this embodiment we have a lamp having 3 sockets in linear arrangement. Through the function selecting circuit 10, the automated driving circuit 20 or the voice-controlled driving circuit 30 is selected for the connection with the function selecting circuit 10. The automated driving circuit 20 or the voice-controlled driving circuit 30 that is in connection with the function selecting circuit 10 would emit a message to the message processing circuit 40, which after proper processing, would relay the message to the controlling circuit 50. Said the controlling circuit 50 would drive the light-emitting circuit 90 according to the message it receives, allowing the light-emitting circuit 90 make the light emitter 91 on the socket 210 of the lamp 200 create controlled changes according to the operation sequence preset by the automated driving circuit 20, or other different changes along with the frequency of sounds coming from the outside. Besides, when the function selecting circuit 10 is in connection with the automated driving circuit 20, the user may use Key to have the automated driving circuit 20 connected with the automated driving circuit 21 to connect the manual operating circuit 22. Thus, the user can manipulate the controlling circuit 50 through key and manual operating circuit 22 to make the Light emitter 91 of the light-emitting circuit 90 conduct different changes according to the selection he (she) makes.

Accordingly, this invention shows an innovative shape and construction and capable of overcoming known flaws, making its operation more practical, this is an ideal invention and meets the requirements for patent.

What is claimed is:

1. An electric circuit device for lighting sets, which features a function selecting circuit in connection with an automated driving circuit of preset operation sequence and a voice-controlled driving circuit that outputs different messages according to a frequency of the voice; the automated driving circuit and the voice-controlled driving circuit are provided in connection with a message processing circuit and the message processing circuit is in connection with a controlling circuit; the controlling circuit has 8 different settings, and is in connection with a light-emitting circuit, so that the user has access to the controlling circuit through the function selecting circuit which is in connection with automated driving circuit or voice-controlled driving circuit; a command generated by the automated driving circuit or the voice-controlled circuit was transmitted to the controlling circuit through the message processing circuit, allowing the controlling circuit to drive the light-emitting circuit so that a light-emitting device on the light-emitting circuit is capable Of creating changes according to the command.

2. The electric circuit device for lighting sets of claim 1, wherein the automated driving circuit is connected to an automated circuit and a manual operating circuit; the function selecting circuit is in connection with the automated driving circuit, when the user starts the manual operating circuit, the automated driving circuit connected to the automated circuit would turn from the automated mode into manual control mode.

* * * * *